United States Patent
Wiktor et al.

(10) Patent No.: US 10,511,897 B2
(45) Date of Patent: *Dec. 17, 2019

(54) METHOD AND APPARATUS FOR PERFORMING AN AUTOMATIC BANDWIDTH MANAGEMENT IN A COMMUNICATION NETWORK

(71) Applicant: ADVA Optical Networking Sp. z o.o., Gdynia (PL)

(72) Inventors: Michal Wiktor, Gdansk (PL); Pawel Kaczmarek, Sopot (PL)

(73) Assignee: ADVA Optical Networking Sp. z o.o., Gdynia (PL)

( * ) Notice: Subject to any disclaimer, the term of this patent is extended or adjusted under 35 U.S.C. 154(b) by 0 days.

This patent is subject to a terminal disclaimer.

(21) Appl. No.: 16/163,505

(22) Filed: Oct. 17, 2018

(65) Prior Publication Data

US 2019/0098382 A1    Mar. 28, 2019

Related U.S. Application Data

(62) Division of application No. 15/454,732, filed on Mar. 9, 2017, now Pat. No. 10,149,026.

(30) Foreign Application Priority Data

Mar. 9, 2016   (EP) ..................... 16159429

(51) Int. Cl.
*H04B 10/27*   (2013.01)
*H04Q 11/00*   (2006.01)
(Continued)

(52) U.S. Cl.
CPC ......... *H04Q 11/0066* (2013.01); *H04B 10/27* (2013.01); *H04L 41/0896* (2013.01);
(Continued)

(58) Field of Classification Search
CPC combination set(s) only.
See application file for complete search history.

(56) References Cited

U.S. PATENT DOCUMENTS 6,963,575 B1 * 11/2005 Sistanizadeh ....... H04L 12/4625
   370/401
6,982,974 B1 *  1/2006 Saleh ................. H04L 49/1515
   340/2.2

(Continued)

FOREIGN PATENT DOCUMENTS

| EP | 2 571 210 A1 | 3/2013 |
| EP | 2 760 169 A1 | 7/2014 |
| WO | WO 00/46957 A2 | 8/2000 |

OTHER PUBLICATIONS

Notice of Allowance and Fee(s) Due for U.S. Appl. No. 15/454,732 (dated Jul. 18, 2018).

(Continued)

*Primary Examiner* — Omar S Ismail
(74) *Attorney, Agent, or Firm* — Jenkins, Wilson, Taylor & Hunt P.A.

(57) ABSTRACT

A communication network (1) comprising an optical transport domain network (2) having optical transport nodes connected to each other via physical optical links, packet switched networks (3) each having a boundary router (4) connected to an optical transport node of said optical transport domain network (2) via an access link (5); and a network management apparatus (6) adapted to perform an automatic bandwidth management of said communication network (1), wherein said network management apparatus (6) is adapted to activate or deactivate virtual links (VL), tributary ports and cross-connections between virtual and access links in the optical transport domain (2) in response to data traffic statistics of data transmitted on said access links (5).

13 Claims, 5 Drawing Sheets

(51) Int. Cl.
*H04L 12/24* (2006.01)
*H04L 12/26* (2006.01)

(52) U.S. Cl.
CPC ........ *H04Q 11/0062* (2013.01); *H04L 41/147* (2013.01); *H04L 43/0894* (2013.01); *H04Q 2011/0079* (2013.01); *H04Q 2011/0083* (2013.01)

(56) References Cited

U.S. PATENT DOCUMENTS

| | | | | |
|---|---|---|---|---|
| 8,406,131 | B2* | 3/2013 | Kotrla | H04L 41/5009 370/230.1 |
| 10,149,026 | B2 | 12/2018 | Wiktor et al. | |
| 2007/0280265 | A1* | 12/2007 | Gerstel | H04J 14/0256 370/395.52 |
| 2010/0039957 | A1* | 2/2010 | Kotrla | H04L 41/5009 370/253 |
| 2011/0229126 | A1* | 9/2011 | Gerstel | H04L 41/0896 398/25 |
| 2011/0286324 | A1 | 11/2011 | Bellagamba et al. | |
| 2013/0191530 | A1 | 7/2013 | Zhang et al. | |
| 2014/0244835 | A1 | 8/2014 | Lopez Alvarez et al. | |
| 2015/0127805 | A1* | 5/2015 | Htay | H04L 43/0876 709/224 |
| 2016/0191194 | A1* | 6/2016 | Wood | H04J 14/0286 398/58 |
| 2016/0197831 | A1* | 7/2016 | De Foy | H04L 45/7453 370/392 |
| 2017/0264981 | A1 | 9/2017 | Wiktor et al. | |

OTHER PUBLICATIONS

Non-Final Office Action for U.S. Appl. No. 15/454,732 (dated Feb. 27, 2018).

Extended Euopean Search Report for European Application No. 16159429.6 (dated Jul. 5, 2016).

Joshi et al., "A Review of Network Traffic Analysis and Prediction Techniques," https://arxiv.org/abs/1507.05722, pp. 1-22, (Jul. 27, 2015).

Zhani et al., "Analysis and Prediction of Real Network Traffic," Journal of Networks, vol. 4, No. 9, pp. 855-865 (Nov. 2009).

* cited by examiner

METHOD AND APPARATUS FOR PERFORMING AN AUTOMATIC BANDWIDTH MANAGEMENT IN A COMMUNICATION NETWORK

PRIORITY CLAIM

This application is a divisional of U.S. patent application Ser. No. 15/454,732, filed Mar. 9, 2017, and which claims the benefit of European Patent Application No. 16159429.6, filed Mar. 9, 2016; the disclosures of which are incorporated herein by reference in their entireties.

TECHNICAL FIELD

The invention relates to a method and apparatus for performing an automatic bandwidth management of a communication network and in particular to a network management apparatus for performing automatic bandwidth management in a communication network.

TECHNICAL BACKGROUND

Software-defined networking SDN allows network administrators to manage network services through abstraction of higher-level functionality. In a SDN network a system making decisions about where data traffic is to be sent is decoupled from an underlying data plane for forwarding the data traffic to a selected destination. A SDN network uses a predetermined protocol which enables the control plane to communicate with the underlying data plane. Examples of protocols used in the SDN network are the NETCONF, RESTCONF or the OpenFlow communication protocol.

The OpenFlow protocol enables network controllers to determine a path of transporting network packets across a network of switches. The OpenFlow protocol is layered on top of a transmission control protocol TCP and prescribes the use of transport layer security TLS. For transporting data traffic, a data plane of a transport network can be used. For instance, an optical transport network OTN based on wavelength division multiplexing can be implemented to transport data traffic via network nodes by traffic switching of optical data units ODUs.

Accordingly, there is a need to use the SDN resources of the optical transport network without any data loss efficiently to avoid unused OTN resources.

SUMMARY OF THE INVENTION

The invention provides according to a first aspect a network management apparatus for performing an automatic bandwidth management of a communication network, said network management apparatus comprising:
- a control data interface adapted to receive data traffic statistics of data transmitted on access links between boundary routers of packet domains and optical transport nodes connected to said boundary routers via access links and
- a control unit having a sensor engine adapted to process the received data traffic statistics and to activate or deactivate virtual links, tributary port and cross-connection between access link and virtual link in the optical transport domain in response to the processed data traffic statistics.

According to the first aspect of the present invention, the data traffic transmitted on at least one access link is monitored by a sensor agent run on the respective boundary router.

A virtual link (VL) is a logical representation of a set of network resources. In a possible embodiment the virtual link can be formed by a lambda channel, i.e. at a wavelength, across multiple optical transport nodes. The concept can be based on the embodiment described in EP 2760169 A1. A presence of a virtual link indicates a potential to reserve this resources. In a preferred embodiment a virtual link is periodically recalculated and can on the timescale take different physical light paths in an optical transport network.

In a further possible embodiment of the network management apparatus according to the first aspect of the present invention, the control data interface of the network management apparatus is connected to the boundary routers and to at least one optical transport node of the optical transport domain via a control layer network.

In a possible embodiment, the control layer network is formed by a DCN network.

In a further possible embodiment of the network management apparatus according to the first aspect of the present invention, the at least one optical transport node connected to the control data interface of the network management apparatus comprises a data memory storing the network topology of the optical transport domain.

In a further possible embodiment of the network management apparatus according to the first aspect of the present invention, the sensor engine of the network management apparatus and the sensor agent run on a boundary router communicate via said control layer network using a NETCONF protocol.

In a further possible embodiment of the network management apparatus according to the first aspect of the present invention, the sensor engine of the network management apparatus and the sensor agent run on a boundary router communicate via said control layer network using a RESTCONF protocol.

In a further possible embodiment of the network management apparatus according to the first aspect of the present invention, the sensor engine of the network management apparatus and the sensor agent run on a boundary router communicate via said control layer network using an OpenFlow, OF, protocol.

In a still further possible embodiment of the network management apparatus according to the first aspect of the present invention, the sensor agent run on a boundary router is adapted to measure time characteristics of data transmitted on access links between the respective boundary router and an optical transport node and to supply the measured time characteristics as data traffic statistics via the control layer network to the control data interface of the network management apparatus.

In a further possible embodiment of the network management apparatus according to the first aspect of the present invention, the sensor agent run on the boundary router is adapted to pre-process to the measured time characteristics to generate data traffic statistics supplied via the control layer network by the means of one of the mentioned protocols (NETCONF, RESTCONF or OpenFlow) to the control data interface of the network management apparatus.

In a further possible embodiment of the network management apparatus according to the first aspect of the present invention, the sensor engine of said network management apparatus is adapted to evaluate a current bandwidth utilization in the optical transport domain based on data collected by the sensor agent in the packet domain and to predict a future bandwidth utilization in the optical network domain on the basis of the monitored current bandwidth utilization.

In a still further possible embodiment of the network management apparatus according to the first aspect of the present invention, if the sensor engine of the network management apparatus detects that the available bandwidth capacity within the optical network domain is not sufficient for the monitored current and/or predicted bandwidth utilization, additional virtual links (together with corresponding tributary ports and cross-connections) are automatically activated by said sensor engine to increase the available bandwidth capacity in the optical transport domain.

In a still further possible embodiment of the network management apparatus according to the first aspect of the present invention, the sensor engine of the network management apparatus is adapted to predict a future bandwidth utilization in the optical network domain using a supervised threshold prediction model, a moving linear prediction model, a discrete wavelet transform prediction model and/or an autoregressive prediction model.

In a still further possible embodiment of the network management apparatus according to the first aspect of the present invention, the links are virtual packet links preconfigured in the optical transport domain.

The invention provides according to the second aspect a communication network comprising:
  an optical transport domain network having optical transport nodes connected to each other via physical optical links,
  packet switched networks each having a boundary router connected to an optical transport node of said optical transport domain network via at least one access link and
  a network management apparatus adapted to perform an automatic bandwidth management of said communication network, wherein said network management apparatus is adapted to activate or deactivate virtual links, tributary ports and cross-connections between virtual and access links in the optical transport domain in response to data traffic statistics of data transmitted on said access links.

In a possible embodiment of the communication network according to the second aspect of the present invention, the network management apparatus comprises a sensor engine adapted to communicate with sensor agents implemented on the boundary routers via a control layer network using a NETCONF protocol, a RESTCONF protocol or using an OpenFlow, OF, protocol.

The invention provides according to the third aspect a method for performing an automatic bandwidth management in a communication network comprising the steps of:
  monitoring data traffic transmitted on access links between boundary routers of packet domains and optical transport nodes of an optical transport domain connected to said boundary routers via the access links to collect data traffic statistics of data transmitted on said access links and
  performing corrective actions in the optical transport domain in response to the collected data traffic statistics by activating or deactivating virtual links in the optical transport domain.

BRIEF DESCRIPTION OF FIGURES

In the following, possible embodiments of the different aspects of the present invention are described in more detail with reference to the enclosed figures.

DETAILED DESCRIPTION OF EMBODIMENTS

Figure 1:
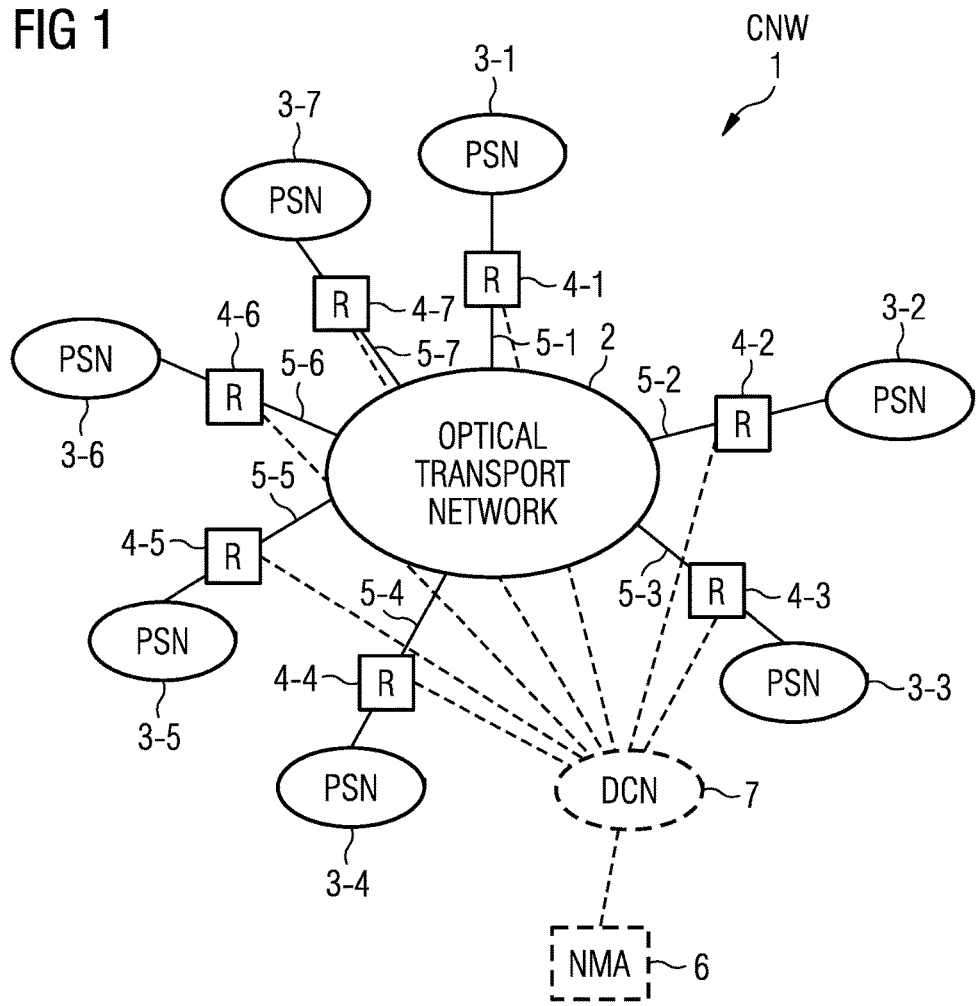
FIG. 1 shows a possible exemplary embodiment of a communication network according to an aspect of the present invention.

As can be seen in FIG. 1, the communication network 1 according to an aspect of the present invention comprises in a possible embodiment a transport network 2 having optical transport nodes connected to each other via physical optical links. The network 2 can form a data plane in a software-defined network SDN. In the illustrated embodiment, the communication network 1 further comprises several packet switched networks 3-1, 3-2, 3-3, 3-4, 3-5, 3-6, 3-7 as shown in FIG. 1. Each packet switched networks 3-$i$ has at least one boundary router 4-1, 4-2, 4-3, 4-4, 4-5, 4-6, 4-7 connected to an optical transport node of the optical transport domain network 2 via at least one access link 5-1, 5-2, 5-3, 5-4, 5-5, 5-6, 5-7 as illustrated in FIG. 1. In a possible embodiment the access links do not require activation because they are always active. The number of boundary routers 4-$i$ connected via access links 5-$i$ to the optical transport network 2 can vary. The optical transport network 2 forms an optical core network of the communication network 1 as shown in FIG. 1. In a possible embodiment, the optical transport network 2 can be implemented by a packet optical transport network comprising wavelength division multiplexed optical channels at the level of optical data units ODUs. The communication network 1 further comprises a network management apparatus 6 adapted to perform an automatic bandwidth management. As shown in FIG. 1, the network management apparatus 6 is connected via a control layer network 7 to the boundary routers 4-$i$ of different packet switched networks 3-$i$. In a possible embodiment, the control layer network 7 is formed by a DCN network. The network management apparatus 6 is connected in a preferred embodiment to at least one optical transport node of the optical transport network 2. This optical transport node comprises in a preferred embodiment a software component storing the network topology of the optical transport domain. The network management apparatus 6 has access to the full network topology of the optical transport network 2, for instance via the DCN network 7. The network topology of the optical transport domain 2 can be stored in a local memory of the network management apparatus 6. The network management apparatus 6 is adapted to activate or deactivate virtual links VL, tributary ports and cross-connections between virtual and access links in the optical transport domain 2 in response to data traffic statistics of data transmitted on the access links 5-*i* connecting the packet switched networks 3-*i* with the optical transport core network 2. The network management apparatus 6 comprises a control data interface adapted to receive data traffic statistics of data transmitted via the access links 5-*i* between the boundary routers 4-*i* and transport nodes of the transport network 2 connected to the boundary routers 4-*i* of the packet switched networks 3-*i* via the access links 5-*i*. The network management apparatus 6 comprises a control unit adapted to process the received data traffic statistics and to activate or deactivate virtual links VL, tributary ports and cross-connections between virtual and access links in the optical transport domain in response to the processed data traffic statistics.

Figure 2:
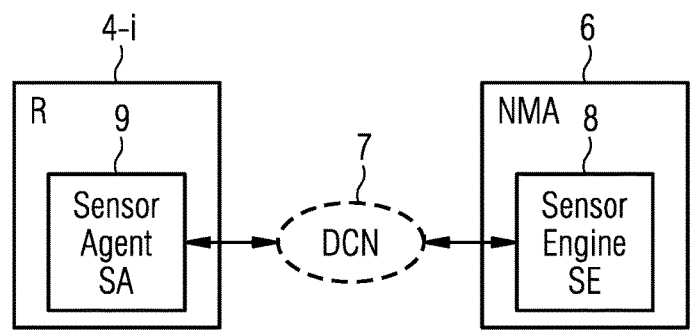
FIG. 2 shows a block diagram for illustrating a possible embodiment of a network management apparatus according to a further aspect of the present invention.

As illustrated in FIG. 2, the network management apparatus 6 can communicate with a boundary router 4-*i* via the control layer network 7. The apparatus 6 comprises in a preferred embodiment a control unit 8 adapted to run a sensor engine SE. The router 4-*i* comprises in a preferred embodiment a control unit 9 adapted to run a sensor agent SA. The data traffic transmitted on an access link 5-*i* is monitored by the sensor agent SA run on the respective boundary router 4-*i*. In a possible embodiment, the sensor engine SE run on the control unit 8 of the network management apparatus 6 and the sensor agent SA run on the control unit 9 of the boundary router 4-*i* communicate with each other via said control layer network 7 using a NETCONF protocol, a RESTCONF protocol or an OpenFlow, OF, protocol.

The sensor agent SA run on the boundary router 4-*i* is adapted in a preferred embodiment to measure time characteristics of data transmitted on the respective access link 5-*i* between the boundary router 4-*i* and an optical transport node. The sensor agent SA is further adapted to supply the measured time characteristics as data traffic statistics via the control layer network 7 to the control protocol of the network management apparatus 6 connected to the control layer network 7. In a possible embodiment, the sensor agent SA is adapted to pre-process measured time characteristics to generate data traffic statistics which are supplied via the control layer network 7 to the control data interface of the network management apparatus 6 and to the sensor engine SE. The sensor agent SA can comprise in a possible implementation an API.

The sensor engine SE run on the network management apparatus 6 is adapted to monitor a current bandwidth utilization in the optical network domain 2 and to predict a future bandwidth utilization in the optical network domain 2 on the basis of the monitored current bandwidth utilization. In a possible embodiment, if the sensor engine SE of the network management apparatus 6 detects that the available bandwidth capacity within the optical network domain is not sufficient for the monitored current and/or predicted bandwidth utilization, additional virtual links VL, tributary ports and cross-connections between virtual and access links are automatically activated by the sensor engine SE to increase the available bandwidth capacity in the optical transport domain 2. The sensor engine SE of the network management apparatus 6 is adapted in a possible embodiment to predict a future bandwidth utilization in the optical network domain 2 using other prediction models. These prediction models can include a moving linear prediction model, a discrete wavelet transform prediction model and/or an autoregressive prediction model. In a possible embodiment, the virtual links VL which can be activated or deactivated by the network management apparatus 6 are formed by virtual packet links preconfigured in the optical transport domain 2.

Figure 3:
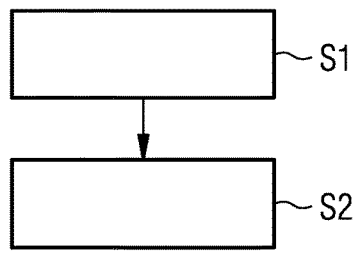
FIG. 3 shows a flowchart for illustrating a possible exemplary embodiment of a method for performing an automatic bandwidth in a communication network according to a further aspect of the present invention.

FIG. 3 shows a flowchart of an exemplary embodiment of a method for performing an automatic bandwidth management in a communication network 1 according to a further aspect of the present invention.

In a first step S1, data traffic transmitted on access links 5-*i* between boundary routers 4-*i* of packet switched networks 3-*i* and optical transport nodes of an optical transport domain 2 connected to boundary routers 4-*i* via the access links 5-*i* are monitored to collect data traffic statistics of data transmitted on said access links 5-*i*.

In a further step S2, corrective actions in the optical domain 2 are performed in response to meeting particular criteria by the collected data traffic statistics by activating or deactivating virtual links in the optical transport domain 2.

Figure 4:
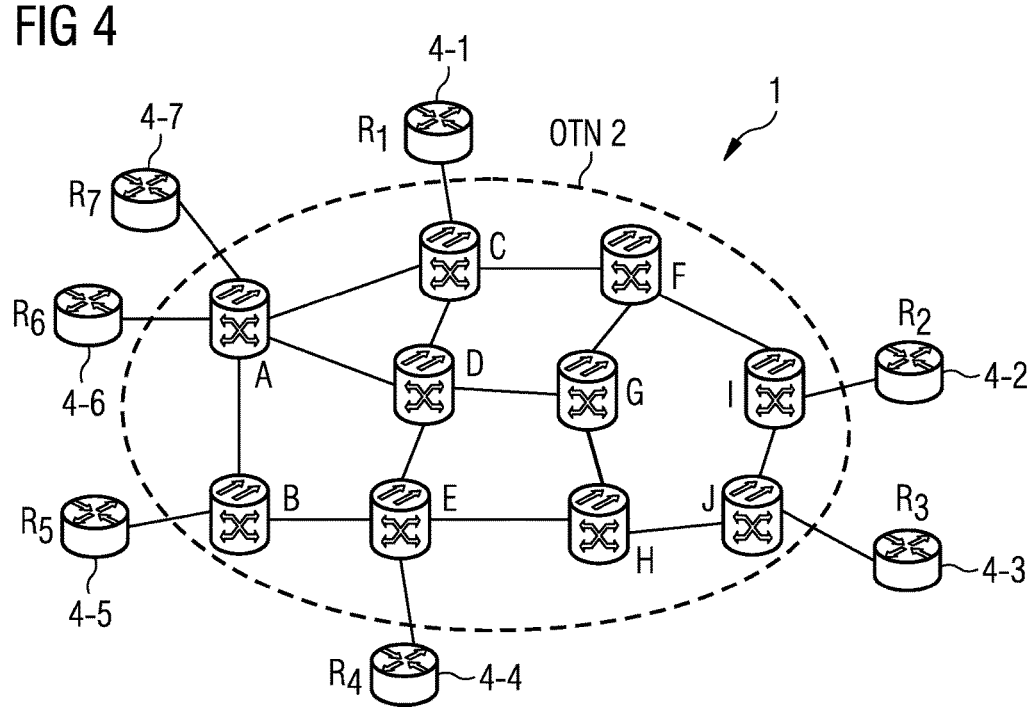
FIG. 4 shows a diagram for illustrating an exemplary embodiment of a communication network according to the present invention.

FIG. 4 shows schematically an exemplary possible embodiment of a communication network 1 according to the present invention having an optical transport network 2 including several optical transport nodes A to J. The optical transport nodes A to J are connected to each other via physical optical links in the illustrated embodiment. The optical transport network 2 comprises boundary optical nodes connected via access links to corresponding boundary routers 4-*i* of different packet switched networks 3-*i*. An optical boundary router of the optical domain 2 can be connected to one or several routers via access links as shown in FIG. 4. The access links 5-*i* between each boundary router of a packet switched network 3-*i* and the corresponding optical network node form a logical representation of a physical connection (fibre) between the boundary router and the optical network node. The network management apparatus 6 of the communication network 1 is not shown in FIG. 4. The apparatus 6 can be connected to all boundary routers 4-1 to 4-7 of the different packet switched networks 3-*i* and to at least one optical transport node A to J of the optical transport domain 2. On each boundary router 4-*i* a sensor agent SA can be executed communicating with the network management apparatus 6 via a control layer network 7 as shown in FIG. 1 using a NETCONF protocol a RESTCONF protocol or an OpenFlow protocol. FIG. 4 shows the physical topology of the optical transport network 2 forming the core network of the communication network 1.

Figure 5A:
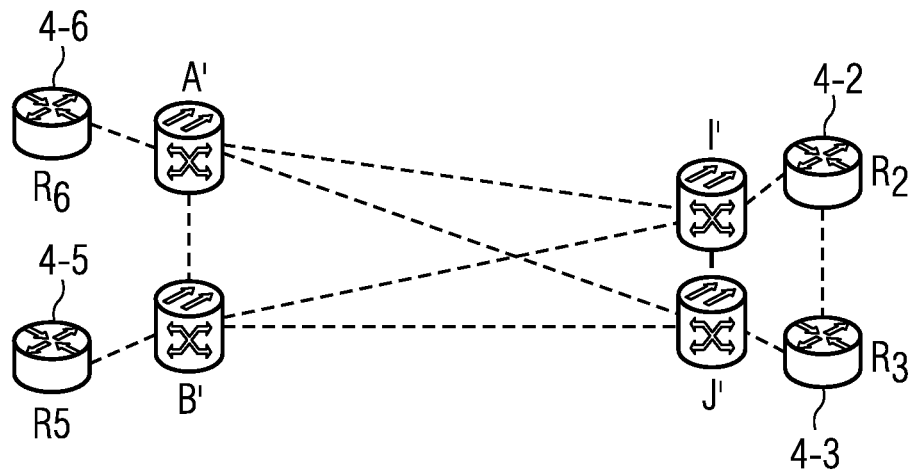
FIGS. 5A, 5B illustrate possible virtual optical transport networks derived from the optical transport network illustrated in FIG. 4.
Figure 5B:
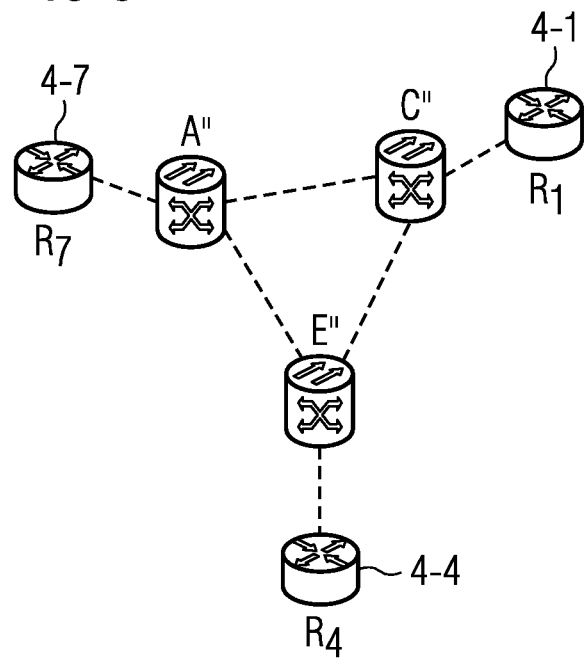

From this physical optical transport network, it is possible to derive different virtual networks as illustrated in FIG. 5A and FIG. 5B. FIG. 5A shows a first virtual network connecting the boundary optical transport network nodes A', B', I', J' via virtual links VL shown as dashed lines in FIG. 5A. Connected to these optical boundary nodes different boundary routers 4-2, 4-3, 4-5, 4-6 of different packet switched networks 3-2, 3-3, 3-5, 3-6 are connected via access links. For the same physical optical transport network 2 as illustrated in FIG. 4 another virtual network can be provided such as shown in FIG. 5B. The second virtual network illustrated in FIG. 5B connects the boundary optical network nodes A", C", E" via virtual links VL shown as dashed lines. To the boundary nodes A", C", E" of the virtual network of FIG. 5B boundary routers 4-1, 4-4, 4-7 of packet switched networks 3-1, 3-4, 3-7 are connected. The bandwidth associated with each of the virtual links VL between border optical transport nodes of the optical domain is not bigger than the bandwidth that can be allocated on access links between these optical transport nodes and corresponding packet devices, i.e. boundary routers.

Figure 6A:
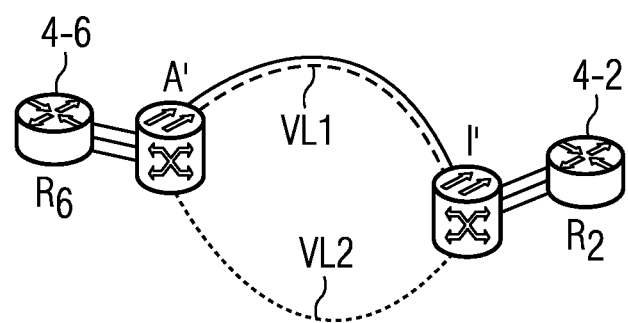
FIGS. 6A, 6B illustrate the activation of a virtual link within the optical transport network of FIG. 4 by a network management apparatus according to the present invention.

In the example illustrated in FIG. 6A, each of the two virtual links VL1, VL2 between the two boundary optical network nodes A', I' represents equal or more bandwidth than the access links between the boundary optical network node I' and the boundary router 4-2 or of the access links between the boundary optical network node A' and the boundary router 4-6. The virtual link VL between A', I' can represent different available light paths between boundary router 4-6 and boundary router 4-2. There can be more access links between the boundary routers and the corresponding boundary optical network nodes and these links cannot have more bandwidth than a single virtual link. The data traffic can be switched between access links and selected virtual links. The sensor engine SE is capable of resolving these constraints. The sensor engine SE of the network management apparatus 6 can monitor a current bandwidth utilization in the optical network domain 2 and predict a future bandwidth utilization in the optical network domain 2 on the basis of the monitored current bandwidth utilization. If the sensor engine SE of the network management apparatus 6 does detect that the available bandwidth capacity within the optical network domain 2 is not sufficient for the monitored current or predicted bandwidth utilization, additional virtual links VL, tributary ports and cross-connections between virtual and access links can be automatically activated by the sensor engine SE to increase the available bandwidth capacity in the optical transport domain 2.

Figure 6B:
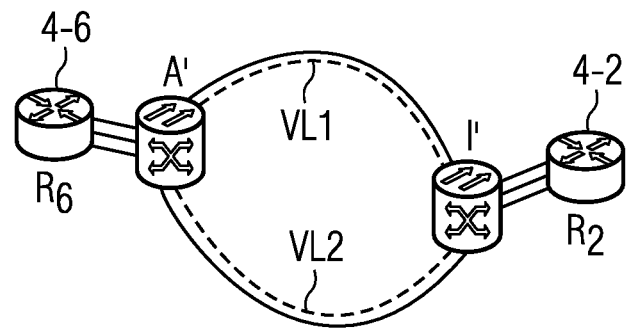
Figure 7:
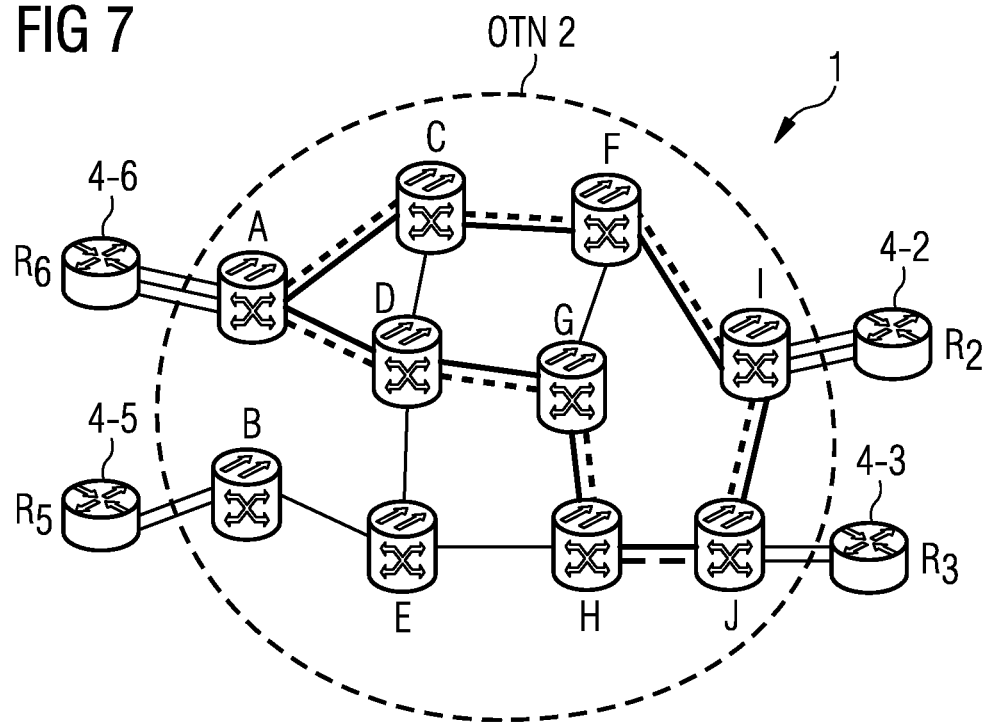
FIG. 7 shows a diagram of the optical transport network shown in FIG. 4 illustrating physical links corresponding to the activated virtual links illustrated in FIG. 6B.

As shown in FIG. 6A, there is a first virtual link VL1 and a second virtual link VL2 between the boundary optical network nodes A', I', wherein the first virtual link VL1 has been activated by the network management apparatus 6. If the sensor engine SE of the network management apparatus 6 does recognize that the available bandwidth capacity in the optical network domain 2 is not sufficient it does automatically activate an additional virtual link VL2 to increase the available bandwidth capacity in the optical transport domain 2. This is illustrated in FIG. 6B. As can be seen in FIG. 6B, the sensor engine SE of the network management apparatus 6 has after evaluation of the available data traffic statistical data activated also the second virtual VL2 so that there are two physical connections between two border optical transport nodes A', I' of the optical transport network 2. The first activated virtual link VL1 corresponds to a physical optical signal path between optical transport nodes of the physical optical transport network 2 as shown in FIG. 7: VL1=A-C-F-I. The second activated virtual link VL2 corresponds to a physical optical signal path as follows: VL2=A-D-G-H-J as shown in FIG. 7.

Figure 8:
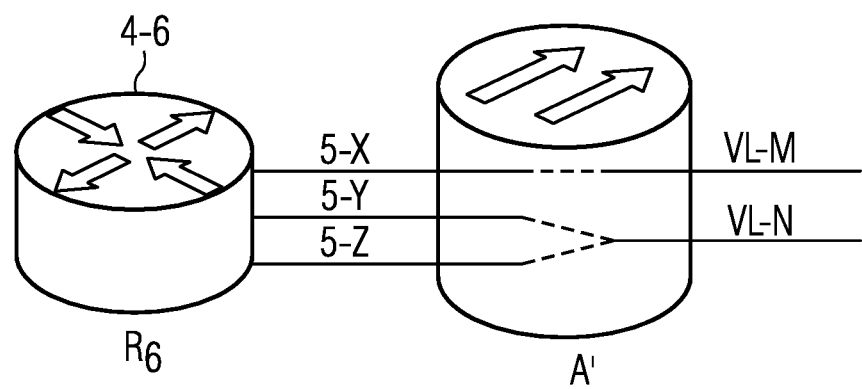
FIG. 8 illustrates the mapping of access links on a virtual link.

FIG. 8 illustrates constraints of mapping of access links on a virtual link VL. A virtual link VL can have one or more access links 5-$i$ mapped onto it. In the illustrated example access link 5-X is mapped on virtual link VL-M and access links 5-Y, 5-Z are mapped on virtual link VL-N. Access links do not require activation (because they are in a preferred embodiment always active). Until a bandwidth allocated on access link 5-X and subsequently virtual link VL-M is sufficient to handle the whole bandwidth demand, no additional virtual link is activated. When the bandwidth demand reaches a predetermined threshold the virtual link VL-N is activated. Data traffic can be located on access link 5-Y or an access link 5-Z or on both access links 5-Y, 5-Z, if a load balancing function on boundary router 4-6 is applied. In addition the tributary port or ports terminating corresponding access links (5-Y, 5-Z) and cross-connections between 5-Y or 5-Z (or both) and VL-N need to be activated. A physical bottom layer of the transport network is in a preferred embodiment formed by physical WDM links which do not have to be visible to the sensor engine SE. In a possible embodiment the sensor engine SE can see a virtual topology built over the physical links visible in an upper layer of the communication network. A virtual link VL can represent a certain bandwidth. When more bandwidth is needed, the network management apparatus 6 does activate additional virtual links VL as illustrated in the example of FIGS. 6A, 6B. This virtual link can represent resources along the same path as well as a diverse path.

The method according to the present invention provides a transparent provisioning of network resources in the optical transport network 2 according to data collected in a packet layer and is applicable to integrated packet and optical transport networks. Time characteristics of data traffic in the packet domain do trigger corresponding corrective actions in the optical transport domain in an automated way using the method according to the present invention. One of three communication options (NETCONF, RESTCONF or OF protocol) between the sensor agent SA and the sensor engine SE run on the network management apparatus 6 should be dictated by the protocol capabilities of the boundary router.

A physical bottom layer of the transport network is in a preferred embodiment formed by physical WDM links which do not have to be visible to the sensor engine SE. In a possible embodiment the sensor engine SE can see a virtual topology built on top of the physical topology and physical links of the communication network. A virtual link VL can represent a certain bandwidth. When more bandwidth is needed, the network management apparatus 6 does activate additional virtual links VL as illustrated in the example of FIGS. 6A, 6B. This virtual link can represent resources along the same path as well as a diverse path. In a possible embodiment, the boundary routers 4-$i$ can preprocess data and send aggregated data to the network management apparatus 6. This significantly reduces the traffic via the control layer network DCN. The type of the transmitted data depends on the prediction process applied by the network management apparatus 6. Using a NETCONF protocol or RESTCONF protocol for communication between the sensor agent SA and the sensor engine SE a high level of flexibility can be achieved. Specifically, the statistical raw data processing can be transparently split between the control unit of the boundary router 4-$i$ and the network management apparatus 6. By defining and advertising appropriate data in a model applied to RESTCONF or NETCONF protocol, a scenario of data processing can balance between performing data analysis solely on the control unit of the network management apparatus 6 or solely on a control unit of edge or boundary routers or an intermediate split of the processing can be applied. In the proposed invention although the packet network data traffic time characteristic can influence the transport network no actions from the transport layers do result in changes in the packet network configuration. The packet switched network control plane is not aware of the optical network physical topology. The packet switched network control plane does also not need to be fully aware of the virtual topology. Provided the network capacity is not exceeded the request of changing bandwidth generated by monitoring the packet network are processed in a transparent way. Statistical data processing can be split between boundary routers 4-$i$ collecting data and a central control unit of a network management apparatus 6 processing the collected data. A parameter of interest when processing the data is the time characteristics of the bandwidth usage. This data can be collected by a sensor agent SA and sent to the sensor engine SE after request from the network management apparatus 6. The sensor engine SE run on the network management apparatus 6 activates and deactivates the virtual links VL, tributary ports and cross-connections between virtual and access links only in the optical transport domain 2 without additional action in the packet domain. Utilization of bandwidth can be detected based on data coming from the packet domain.

In a further implementation, the way how measurement data is exchanged between the sensor agent SA and the sensor engine SE can be determined by the communication technique and protocol. The measurement data can be sent either after a query has been sent by the network management apparatus 6 or as asynchronous notifications for which a sensor can subscribe for.

In one possible embodiment for communication between the sensor agent SA and the sensor engine SE a YANG model based protocol (NETCONF or RESTCONF) is used. In this case it is important to identify the model. For raw, unprocessed statistical data the following attributes of the "ietf-interfaces.yang" (RFC 7223) can be used:

```
+--ro statistics
   +--ro discontinuity-time      yang:date-and-time
   +--ro in-octets?              yang:counter64
   +--ro in-unicast-pkts?        yang:counter64
   +--ro in-broadcast-pkts?      yang:counter64
   +--ro in-multicast-pkts?      yang:counter64
   +--ro in-discards?            yang:counter32
   +--ro in-errors?              yang:counter32
   +--ro in-unknown-protos?      yang:counter32
   +--ro out-octets?             yang:counter64
   +--ro out-unicast-pkts?       yang:counter64
   +--ro out-broadcast-pkts?     yang:counter64
   +--ro out-multicast-pkts?     yang:counter64
   +--ro out-discards?           yang:counter32
   +--ro out-errors?             yang:counter32
```

Built-in protocol statistics capabilities can be used. In this possible embodiment a sensor agent SA is reduced to statistics exposure from the boundary routers of the packet switched networks. In another possible embodiment a sensor agent SA run on boundary routers of the packet switched networks performs pre-processing of the statistical data. Pre-processing of raw, statistical data implicates the NETCONF model augmentation. The objects and attributes can correspond to some aggregator parameters like moving average or ARMA models.

In another possible embodiment for communication between sensor agent SA and sensor engine SE OpenFlow OF protocol is used. The functionality can be achieved by "ofp multipart request" and "ofp multipart response". The following fields of the OFPNP PORT STATS can be used for the collection of the measurement data:

```
uint64_t rx_packets;    /* Number of received packets.        */
uint64_t tx_packets;    /* Number of transmitted packets.     */
uint64_t rx_bytes;      /* Number of received bytes.          */
uint64_t tx_bytes;      /* Number of transmitted bytes.       */
uint64_t rx_dropped;    /* Number of packets dropped by RX    */
uint64_t tx_dropped;    /* Number of packets dropped by TX    */
uint64_t rx_errors;     /* Number of receive errors. This     */
                        /* is a super-set of more specific    */
                        /* receive errors and should be       */
                        /* greater than or equal to the       */
                        /* sum of all rx_*_err values in      */
                        /* properties                         */
```

-continued

```
uint64_t tx_errors;     /* Number of transmit errors. This    */
                        /* is a super-set of more specific    */
                        /* transmit errors and should be      */
                        /* greater than or equal to the       */
                        /* sum of all tx_*_err values         */
                        /* (none currently defined).          */
```

The sensor engine SE of the network management apparatus 6 can monitor the bandwidth utilization and detect whether a currently available capacity is sufficient and will be sufficient in the near future. If the bandwidth is not sufficient an additional virtual channel can be provisioned and set up in order to smoothly increase the capacity of the transport tunnel in the WDM layer without affecting the packet layer. A decision algorithm can be chosen by a network operator. Apart from a default plug-in, a simple API can be exposed for the user. This API can provide a function for querying a data rate for a given channel and sending a request for an additional connection. The API can hide the protocol used to send data between boundary routers so that the application run on the network management apparatus 6 remains unaware of the underlying protocols. A decision whether the bandwidth utilization growth qualifies for the activation of a new virtual link VL can be based on data statistics. An objective is to minimize false positive alarms and false negative decisions. Generally, prediction methods are subject to some uncertainty intervals so that the decisions are not always 100% correct. A further goal is to minimize losses in data. Specifically, the goal is to detect if the bandwidth utilization is growing or if a plateau is reached. To distinguish these variations of dynamics or to detect a need to raise an alarm different strategies or predictions models can be used. In a possible embodiment, the network management apparatus 6 is adapted to predict a future bandwidth utilization in the optical network domain 2 using a prediction model with predetermined threshold values. By using a threshold it is possible to trigger a too low bandwidth alarm based on monitoring the data transfer. For instance, when the actually utilized bandwidth reaches a limit of 80% of the capacity a new channel can be provisioned by the network management apparatus 6.

In a further possible embodiment, the sensor engine SE of the network management apparatus 6 is adapted to predict a future bandwidth utilization in the optical domain 2 using a supervised threshold prediction model. This supervised threshold prediction model takes into account the dynamics of data transfer growth. For rapidly growing bandwidth utilization provisioning is done faster compared to smooth changes. When using the supervised threshold prediction model the threshold depends not only on the absolute level of data traffic or stimulation but also on its dynamics.

In a still further possible embodiment, the sensor engine SE of the network management apparatus 6 is adapted to predict a future bandwidth utilization in the optical network domain 2 using a moving linear prediction model. Without noise the point where the speed of growth decays and a plateau is reached easily visible or detectable. With presence of noise which in this case can comprise random bandwidth fluctuations the inflection point can be invisible. In order to minimize such noise a moving linear prediction model can be used.

In a still further possible embodiment, the sensor engine SE of the network management apparatus 6 is adapted to predict the future bandwidth utilization in the optical network domain using a discrete wavelet transform prediction model. A wavelet transform is an enhanced version of a periodogram where the variation of spectrum in time can be observed. In a possible implementation, a discrete wavelet transform DWT based on Daubechies wavelets can be used. After application of the discrete wavelet transform DWT, a low and high frequency sequence can be obtained. The calculation is based on ratio between these two components.

In a further possible embodiment, the sensor engine SE of the network management apparatus 6 is adapted to predict a future bandwidth utilization in the optical network domain 2 by using an autoregressive prediction model. Autoregressive and moving average data models can be used in time series analyses. A decision depends on some kind of aggregated data. In a simple implementation, i.e. moving average, the average of a given number of measurements is processed instead of the data itself. Provided that aggregation is performed an initial pre-processing can be performed by the sensor agents SA running on the boundary routers instead on the sensor engine SF. In this way, the amount of transferred data supplied by the sensor agent SA to the sensor engine SE can be significantly reduced.

The invention claimed is:

1. A network management apparatus for performing an automatic bandwidth management of a communication network, said network management apparatus comprising:
   a control data interface adapted to receive data traffic statistics of data transmitted via the access links, between boundary routers of packet domains and optical transport nodes of said communication network connected to said boundary routers via said access links; and
   a control unit having a sensor engine adapted to process the received data traffic statistics and to activate or deactivate virtual links, tributary ports and cross-connections between virtual and access links in the optical transport domain in response to the processed data traffic statistics,
wherein said sensor engine of said network management apparatus is adapted to evaluate a current bandwidth utilization in the optical transport domain based on data collected by the sensor agent in the packet domain and to predict a future bandwidth utilization on the basis of monitored current bandwidth utilization dynamics, and
wherein if the sensor engine of the network management apparatus detects that the available bandwidth capacity within the optical network domain is not sufficient for the monitored current and/or predicted bandwidth utilization, additional virtual links, tributary ports and cross-connections between virtual and access links are automatically activated by said sensor engine to increase the available bandwidth capacity in the optical transport domain.

2. The network management apparatus according to claim 1, wherein the data traffic transmitted on at least one access link, is monitored by a sensor agent run on a control unit of the respective boundary router.

3. The network management apparatus according to claim 1, wherein the control data interface of the network management apparatus is connected to the boundary routers and to at least one optical transport node of the optical transport domain via a control layer network.

4. The network management apparatus according to claim 1, wherein the at least one optical transport node connected to the control data interface of the network management apparatus comprises a software component storing the network topology of the optical transport domain.

5. The network management apparatus according to claim 1, wherein the sensor engine of the network management apparatus and the sensor agent run on a boundary router communicate via said control layer network using a NETCONF protocol or a RESTCONF protocol or an OpenFlow, OF, protocol.

6. The network management apparatus according to claim 2,
   wherein the sensor agent run on a boundary router is adapted to measure time characteristics of data transmitted on access links between the respective boundary router and an optical transport node and to supply the measured time characteristics as data traffic statistics via the control layer network to the control data interface of said network management apparatus.

7. The network management apparatus according to claim 6, wherein the sensor agent run on the boundary router is adapted to pre-process to the measured time characteristics to generate data traffic statistics supplied via the control layer network to the control data interface of said network management apparatus.

8. The network management apparatus according to claim 6, wherein the sensor agent comprises an API implemented on the boundary router.

9. The network management apparatus according to claim 1, wherein the sensor engine of the network management apparatus is adapted to predict a future bandwidth utilization in the optical network domain using a supervised threshold prediction model, a moving linear prediction model, a discrete wavelet transform prediction model and/or an autoregressive prediction model.

10. The network management apparatus according to claim 1, wherein the virtual links are virtual packet links preconfigured in the optical transport domain.

11. A communication network comprising:
   an optical transport domain network having optical transport nodes connected to each other via physical optical links,
   packet switched networks each having a boundary router connected to an optical transport node of said optical transport domain network via at least one access link; and
   a network management apparatus adapted to perform an automatic bandwidth management of said communication network,
wherein said network management apparatus is adapted to activate or deactivate virtual links, tributary ports and cross-connections between virtual and access links in the optical transport domain in response to data traffic statistics of data transmitted on said access links,
wherein said network management apparatus comprises a sensor engine adapted to evaluate a current bandwidth utilization in the optical transport domain based on data collected by the sensor agent in the packet domain and to predict a future bandwidth utilization on the basis of monitored current bandwidth utilization dynamics, and
wherein if the sensor engine of the network management apparatus detects that the available bandwidth capacity within the optical network domain is not sufficient for the monitored current and/or predicted bandwidth utilization, additional virtual links, tributary ports and cross-connections between virtual and access links are automatically activated by said sensor engine to increase the available bandwidth capacity in the optical transport domain.

12. The communication network according to claim 11, wherein said sensor engine is adapted to communicate with sensor agents implemented on said boundary routers via a control layer network using a NETCONF protocol or an OpenFlow, OF, protocol.

13. A method for performing an automatic bandwidth management in a communication network comprising the steps of:
- monitoring data traffic transmitted on access links between boundary routers of packet domains and optical transport nodes of an optical transport domain connected to said boundary routers via the access links to collect data traffic statistics of data transmitted on said access links; and
- performing corrective actions in the optical transport domain in response to the collected data traffic statistics by activating or deactivating virtual links in the optical transport domain,
- wherein current bandwidth utilization in the optical transport domain is evaluated based on data collected by a sensor agent in the packet domain and a future bandwidth utilization is predicted on the basis of monitored current bandwidth utilization dynamics, and
- wherein if it is detected that the available bandwidth capacity within the optical network domain is not sufficient for the monitored current and/or predicted bandwidth utilization, additional virtual links, tributary ports and cross-connections between virtual and access links are automatically activated to increase the available bandwidth capacity in the optical transport domain.

* * * * *